United States Patent
Pawlik et al.

(10) Patent No.: US 8,759,437 B2
(45) Date of Patent: Jun. 24, 2014

(54) COMPOSITE FORMED FROM A POLYAMIDE MOULDING COMPOSITION AND A VULCANIZED ELASTOMER

(75) Inventors: Andreas Pawlik, Recklinghausen (DE); Harald Haeger, Luedinghausen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/639,005

(22) PCT Filed: May 3, 2011

(86) PCT No.: PCT/EP2011/057000
§ 371 (c)(1), (2), (4) Date: Oct. 2, 2012

(87) PCT Pub. No.: WO2011/138300
PCT Pub. Date: Nov. 10, 2011

(65) Prior Publication Data
US 2013/0030109 A1    Jan. 31, 2013

(30) Foreign Application Priority Data
May 4, 2010    (DE) .......................... 10 2010 028 541

(51) Int. Cl.
*C08L 51/00* (2006.01)
*C08L 51/08* (2006.01)

(52) U.S. Cl.
USPC ........................................... 524/504; 525/63

(58) Field of Classification Search
USPC ....................................................... 524/504
See application file for complete search history.

(56) References Cited

U.S. PATENT DOCUMENTS

| | | | |
|---|---|---|---|
| 6,162,385 A | 12/2000 | Grosse-Puppendahl et al. | |
| 6,355,358 B1 * | 3/2002 | Boer et al. | 428/474.4 |
| 2002/0082352 A1 * | 6/2002 | Schmitz et al. | 525/179 |
| 2009/0065085 A1 * | 3/2009 | Dowe et al. | 138/137 |

FOREIGN PATENT DOCUMENTS

| | | |
|---|---|---|
| EP | 1 065 048 | 1/2001 |
| EP | 1 216 823 | 6/2002 |

OTHER PUBLICATIONS

International Search Report Issued Aug. 3, 2011 in PCT/EP11/57000 Filed May 3, 2011.

* cited by examiner

*Primary Examiner* — Hui Chin
(74) *Attorney, Agent, or Firm* — Oblon, Spivak, McClelland, Maier & Neustadt, L.L.P.

(57) ABSTRACT

In a composite component assembled from at least one component piece comprising a polyamide molding composition with at least one component piece comprising a vulcanized elastomer, the polyamide molding composition comprises at least 40% by weight of a mixture of the following constituents: a) 60 to 99 parts by weight of polyamide and b) 1 to 40 parts by weight of a graft copolymer obtainable using the following monomers: a) 0.5% to 25% by weight, based on the graft copolymer, of a polyamine having at least 4 nitrogen atoms and also β) 75% to 99.5% by weight, based on the graft copolymer, of polyamide-forming monomers selected from lactams, ω-amino carboxylic acids and/or equimolar combinations of diamine and dicarboxylic acid, wherein the parts by weight of a) and b) sum to 100. The presence of the graft copolymer effectuates improved adherence between the component pieces.

18 Claims, No Drawings

COMPOSITE FORMED FROM A POLYAMIDE MOULDING COMPOSITION AND A VULCANIZED ELASTOMER

The invention relates to a composite part which is composed of at least one subsection made of a polyamide moulding composition and of at least one subsection made of a vulcanized elastomer. The individual subsections are macroscopic mouldings, but are not by way of example dispersed particles in a plastics-elastomer blend. Blends of that type are therefore not composite parts for the purposes of the invention. The invention also relates to a process for producing these composite parts.

Composite parts made of stiff thermoplastic mouldings and of elastomeric mouldings are usually joined through adhesive bonding, screw threads, mechanical interlocking, or use of an adhesion promoter, since the vast majority of combinations of thermoplastic and elastomer cannot provide sufficiently strong adhesion.

EP 0142930 A2 indicates a possible method of producing composites made of polyamides and of EPDM elastomers. Here, a mixture made of dicumyl peroxide and N,N'-m-phenylenedimaleimide is added as vulcanizing agent to the rubber. However, the resultant bond strengths are too low for many technical applications.

U.S. Pat. No. 5,132,182 says that polyamides having an excess of terminal amino groups have good adhesion to carboxylated EPDM rubbers or carboxylated NBR rubbers. U.S. Pat. No. 5,484,848 provides another solution, which consists in the presence of an unsaturated silane in the compounded rubber material. In both instances, the bond strength values achieved are considerable; however, the methods have some attendant disadvantages. By way of example, if there is a relatively high concentration of reactive groups in the compounded rubber material, undesired adhesion can occur to the metal mould usually used during the vulcanization process.

JP 2004035729 A describes the use of trimethylolpropane trimethacrylate (TMPTMA) as adhesion-promoting component in aliphatic polyamides for the composite with peroxidically crosslinkable EPDM rubber. Disadvantages of TMPTMA are its ability to migrate and its water-polluting properties.

Starting from this prior art, an object was to provide a process which overcomes the main disadvantages mentioned and which can produce a strong composite made of a part made of a polyamide moulding composition and of a part made of a vulcanized elastomer. In particular, it should also be possible to use conventional commercially available types of polyamide, where these mostly have an excess of terminal carboxy groups.

Surprisingly, it has been found that this object is achieved if the polyamide moulding composition comprises highly branched graft copolymers which comprise a polyamine fraction and polyamide chains applied by grafting.

The invention therefore provides a composite part which is composed of at least one subsection made of a polyamide moulding composition and of at least one subsection made of a vulcanized elastomer, where at least 40% by weight, preferably at least 50% by weight, particularly preferably at least 60% by weight, and with particular preference at least 70% by weight, of the polyamide moulding composition is composed of the mixture of the following components:
a) from 60 to 99 parts by weight, preferably from 65 to 98 parts by weight and particularly preferably from 70 to 97 parts by weight, of polyamide and
b) from 1 to 40 parts by weight, preferably from 2 to 35 parts by weight and particularly preferably from 3 to 30 parts by weight, of a graft copolymer which can be produced by using the following monomers:
α) from 0.5 to 25% by weight, preferably from 1 to 20% by weight and particularly preferably from 2 to 16% by weight, based on the graft copolymer, of a polyamine having at least 4, preferably at least 8 and particularly preferably at least 11 nitrogen atoms and
β) from 75 to 99.5% by weight, preferably from 80 to 99% by weight and particularly preferably from 84 to 98% by weight, based on the graft copolymer, of polyamide-forming monomers selected from lactams, ω-aminocarboxylic acids and/or equimolar combinations of diamine and dicarboxylic acid,
where the total of the parts by weight of a) and b) is 100.

The polyamide can be produced from a combination of diamine and dicarboxylic acid, from an ω-aminocarboxylic acid or from the corresponding lactam. In principle, it is possible to use any polyamide, for example PA6, PA66, PA610, PA88, PA612, PA810, PA108, PA9, PA613, PA614, PA812, PA128, PA1010, PA10, PA814, PA148, PA1012, PA11, PA1014, PA1212 and PA12. The production of the polyamides is prior art. It is also possible, of course, to use copolyamides based thereon.

The polyamide can also be a polyetheramide. Polyetheramides are known in principle, for example from DE-A 30 06 961. They comprise a polyetherdiamine as comonomer. Suitable polyetherdiamines are accessible through conversion of the corresponding polyetherdiols by reductive amination, or coupling onto acrylonitrile with subsequent hydrogenation (e.g. EP-A-0 434 244; EP-A-0 296 852). They generally have a number-average molecular weight of from 230 to 4000; their polyetheramide content is preferably from 5 to 50% by weight.

Polyetherdiamines derived from propylene glycol are available commercially as JEFFAMIN® D grades from Huntsman. Other polyetherdiamines which also in principle have good suitability derive from 1,4-butanediol or 1,3-butanediol, or are mixed-structure polyetherdiamines, for example having random or blockwise distribution of the units deriving from the diols.

It is also possible to use mixtures of various polyamides, with the proviso that compatibility is adequate. The person skilled in the art is aware of compatible polyamide combinations; combinations that may be listed here by way of example are PA6/PA66, PA12/PA1012, PA12/PA1212, PA612/PA12, PA613/PA12, PA1014/PA12 and PA610/PA12 and corresponding combinations with PA11. In the event of doubt, compatible combinations can be determined through routine experimentation.

One possible embodiment uses a mixture made of from 30 to 99% by weight, preferably from 40 to 98% by weight and particularly preferably from 50 to 96% by weight, of polyamide in the narrower sense and from 1 to 70% by weight, preferably from 2 to 60% by weight and particularly preferably from 4 to 50% by weight, of polyetheramide.

Instead of aliphatic polyamides, it is also advantageously possible to use a semiaromatic polyamide in which from 5 to 100 mol % of the dicarboxylic acid fraction derives from aromatic dicarboxylic acid having from 8 to 22 carbon atoms, and which preferably has a crystallite melting point $T_m$ of at least 250° C. according to ISO 11357-3, particularly preferably at least 260° C. and with particular preference at least 270° C. These polyamides are usually termed PPA. They can be produced from a combination of diamine and dicarboxylic acid, optionally with addition or an ω-aminocarboxylic acid, or from the corresponding lactam. Examples of suitable types are PA66/6T, PA6/6T, PA6T/MPMDT (MPMD represents 2-methylpentamethylenediamine), PA9T, PA10T, PA11T, PA12T, PA14T and copolycondensates of these last types with an aliphatic diamine and with an aliphatic dicarboxylic acid or with an ω-aminocarboxylic acid or, respectively, a lactam. The semiaromatic polyamide can also be used in the form of blend with another, for example aliphatic, polyamide, for example with PA6, PA66, PA11 or PA12.

Transparent polyamides are another suitable class of polyamide; in most instances these are amorphous, but they can also be microcrystalline. They can be used either per se or in a mixture with aliphatic and/or semiaromatic polyamides, e.g. PA6, PA66, PA11 or PA12. Achievement of good adhesion is not dependent on the extent of transparency; the decisive factor here is that the glass transition temperature $T_g$ is at least 110° C., measured according to ISO 11357-3, preferably at least 120° C., particularly preferably at least 130° C. and with particular preference at least 140° C. Examples of suitable transparent polyamides are:

- the polyamide made of 1,12-dodecanedioic acid and 4,4'-diaminodicyclohexylmethane (PA PACM12), in particular starting from a 4,4'-diaminodicyclohexylmethane having from 35 to 65% of a trans,trans-isomer content;
- the polyamide made of terephthalic acid and/or isophthalic acid and of the isomer mixture made of 2,2,4- and 2,4,4-trimethylhexamethylenediamine,
- the polyamide made of isophthalic acid and 1,6-hexamethylenediamine,
- the copolyamide made of a mixture made of terephthalic acid/isophthalic acid and 1,6-hexamethylenediamine, optionally in a mixture with 4,4'-diaminodicyclohexylmethane,
- the copolyamide made of terephthalic acid and/or isophthalic acid, 3,3'-dimethyl-4,4'-diaminodicyclohexylmethane and laurolactam or caprolactam,
- the (co)polyamide made of 1,12-dodecanedioic acid or sebacic acid, 3,3'-dimethyl-4,4'-diaminodicyclohexylmethane and optionally laurolactam or caprolactam,
- the copolyamide made of isophthalic acid, 4,4'-diaminodicyclohexylmethane and laurolactam or caprolactam,
- the polyamide made of 1,12-dodecanedioic acid and 4,4'-diaminodicyclohexylmethane (with low trans,trans-isomer content),
- the copolyamide made of terephthalic acid and/or isophthalic acid and of an alkyl-substituted bis(4-aminocyclohexyl)methane homologue, optionally in a mixture with hexamethylenediamine,
- the copolyamide made of bis(4-amino-3-methyl-5-ethylcyclohexyl)methane, optionally together with a further diamine, and isophthalic acid, optionally together with a further dicarboxylic acid,
- the copolyamide made of a mixture of m-xylylenediamine and of a further diamine, e.g. hexamethylenediamine, and isophthalic acid, optionally together with a further dicarboxylic acid, e.g. terephthalic acid and/or 2,6-naphthalenedicarboxylic acid,
- the copolyamide made of a mixture of bis(4-aminocyclohexyl)methane and bis(4-amino-3-methylcyclohexyl)methane and aliphatic dicarboxylic acids having from 8 to 14 carbon atoms and
- polyamides or copolyamides made of a mixture which comprises 1,14-tetradecanedioic acid and an aromatic, arylaliphatic or cycloaliphatic diamine.

These examples can be varied very widely by adding further components (e.g. caprolactam, laurolactam or diamine/dicarboxylic acid combinations) or from partial or complete replacement of starting components by other components.

The amino group concentration in the graft copolymer is preferably in the range from 100 to 2500 mmol/kg.

By way of example, the following classes of substance can be used as polyamine:

- polyvinylamines (Römpp Chemie Lexikon, 9th Edition, Volume 6, page 4921 [Römpp's Chemical Encyclopaedia] Georg Thieme Verlag Stuttgart 1992);
- polyamines which are produced from alternating polyketones (DE-A 196 54 058);
- dendrimers, for example
  (($H_2N$—($CH_2$)$_3$)$_2N$—($CH_2$)$_3$)$_2$—N($CH_2$)$_2$—N(($CH_2$)$_2$—N(($CH_2$)$_3$—$NH_2$)$_2$)$_2$
  (DE-A-196 54 179) or
- tris(2-aminoethyl)amine, N,N-bis(2-aminoethyl)-N',N'-bis[2-[bis(2-aminoethyl)amino]-ethyl]-1,2-ethanediamine,
- 3,15-bis(2-aminoethyl)-6,12-bis[2-[bis(2-aminoethyl)amino]ethyl]-9-[2-[bis[2-bis(2-aminoethyl)amino]ethyl]amino]ethyl]-3,6,9,12,15-pentaazaheptadecane-1,17-diamine (J. M. Warakomski, Chem. Mat. 1992, 4, 1000-1004);
- linear polyethyleneimines which can be produced through polymerization of 4,5-dihydro-1,3-oxazoles and subsequent hydrolysis (Houben-Weyl, Methoden der Organischen Chemie [Methods of Organic Chemistry], Volume E20, pages 1482-1487, Georg Thieme Verlag Stuttgart, 1987);
- branched polyethyleneimines which are obtainable through polymerization of aziridines (Houben-Weyl, Methoden der Organischen Chemie [Methods of Organic Chemistry], Volume E20, pages 1482-1487, Georg Thieme Verlag Stuttgart, 1987) and which generally have the following amino group distribution:
  from 25 to 46% of primary amino groups,
  from 30 to 45% of secondary amino groups and
  from 16 to 40% of tertiary amino groups.

In the preferred case, the number-average molar mass $M_n$ of the polyamine is at most 20 000 g/mol, particularly at most 10 000 g/mol and in particular at most 5000 g/mol.

Lactams or ω-aminocarboxylic acids, where these are used as polyamide-forming monomers, comprise from 4 to 19 carbon atoms, and in particular from 6 to 12. It is particularly preferable to use ε-caprolactam, ε-aminocaproic acid, capryolactam, ω-aminocaprylic acid, laurolactam, ω-aminododecanoic acid and/or ω-aminoundecanoic acid.

Examples of combinations of diamine and dicarboxylic acid are hexamethylenediamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/dodecanedioic acid and dodecamethylenediamine/2,6-naphthalenedicarboxylic acid. However, it is also possible to use, alongside these, any of the other combinations, e.g. decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/co-aminoundecanoic acid, decamethylenediamine/dodecanedioic acid/laurolactam, decamethylenediamine/terephthalic acid/laurolactam or dodecamethylenediamine/2,6-naphthalenedicarboxylic acid/laurolactam.

It is desirable that the graft copolymer has substantial content of amino groups. It is particularly preferable that the concentration of amino groups in the graft copolymer is in the range from 150 to 1500 mmol/kg, in particular in the range from 250 to 1300 mmol/kg and very particularly in the range from 300 to 1100 mmol/kg. Here and hereinafter, the term amino groups means not only terminal amine groups but also any secondary or tertiary amino functions present in the polyamine.

The production of these graft copolymers has been described in more detail in EP-A-1 065 048.

For the purposes of this invention, polyamide moulding compositions are preparations which have been produced from polyamides with the intention of improving processing properties or modifying service properties. They can by way of example comprise the following additions:

a) other polymers, such as impact modifiers, ABS or polyphenylene ethers. Care has to be taken here that no phase inversion occurs, i.e. that the matrix of the moulding composition is formed from polyamide or that at least an interpenetrating network is present. The person skilled in the art is aware that phase morphology is primarily dependent on the proportions by volume of the individual polymers, and also on the melt viscosities. If the other polymer has a markedly higher melt viscosity than the polyamide, the polyamide still forms the matrix even when the amount present thereof is less than 50 percent by volume of the thermoplastic content, for example about 40 percent by volume. This is particularly relevant in the case of blends with polyphenylene ether;

b) fibrous reinforcing materials, such as glass fibres with round or flat cross section, carbon fibres, aramid fibres, stainless-steel fibres or potassium titanate whiskers;

c) fillers, such as talc powder, mica, silicate, quartz, zirconium dioxide, aluminium oxide, iron oxides, zinc sulphide, graphite, molybdenum disulphide, titanium dioxide, wollastonite, kaolin, amorphous silicas, magnesium carbonate, chalk, lime, feldspar, barium sulphate, conductive carbon black, graphite fibrils, solid glass beads, hollow glass beads or ground glass;

d) plasticizers, e.g. esters of p-hydroxybenzoic acid having from 2 to 20 carbon atoms in the alcohol component or amides of arylsulphonic acids having from 2 to 12 carbon atoms in the amine component, preferably amides of benzenesulphonic acid;

e) pigments and/or dyes, e.g. carbon black, iron oxide, zinc sulphide, ultramarine, nigrosin, pearl-lustre pigments or metal flakes;

f) flame retardants, such as antimony trioxide, hexabromocyclododecane, tetrabromobisphenol, borates, red phosphorus, magnesium hydroxide, aluminium hydroxide, melamine cyanurate and its condensates, such as melam, melem, melon, melamine compounds, such as melamine pyro- and polyphosphate, ammonium polyphosphate, and organophosphorus compounds and salts thereof, e.g. resorcinol diphenyl phosphate, phosphonic esters or metal phosphinates;

g) processing aids, such as paraffins, fatty alcohols, fatty acid amides, paraffin waxes, montanates or polysiloxanes, and h) stabilizers, e.g. copper salts, molybdenum salts, copper complexes, phosphites, sterically hindered phenols, secondary amines, UV absorbers or HALS stabilizers.

An example of an elastomer that can be used is EPDM, EPM, ACM, fluororubber, NBR, HNBR or AEM, individually or in combination. The elastomers are used in the form of a compounded rubber material which by way of example comprises vulcanizing agents, vulcanization activators, oils and/or fillers.

EPDM rubber is produced in a known manner through polymerization of a mixture made of ethene and propene and also of a diene, in the presence of a Ziegler-Natta catalyst, e.g. diethylaluminium chloride. The mixture polymerized generally comprises a mixture made of more than 25% of ethene, more than 25% by weight of propene and from 1 to 10% by weight, preferably from 1 to 3% by weight, of an unconjugated diene, such as bicyclo[2.2.1]heptadiene, 1,5-hexadiene, 1,4-dicyclopentadiene or in particular 5-ethylidenenorbornene. The production of EPM rubber uses a corresponding method but without diene.

ACM rubbers (acrylate rubbers) are copolymers or, respectively, terpolymers made of acrylic esters (e.g. ethyl acrylate and other acrylates) and from 1 to 5% of reactive comonomers. The production method uses emulsion polymerization or suspension polymerization. Typical crosslinking components are 2-chloroethyl vinyl ether, chlorovinyl acetate, N-methylolacrylamide or glycidyl methacrylate. The crosslinking can, for example, take place by way of diamines.

Suitable fluororubbers are described by way of example in K. Nagdi, Gummi-Werkstoffe, p. 254 ff., Vogel-Verlag Würzburg 1981 and in The Vanderbilt Rubber Handbook, 13th Edition, pp. 211 ff., Vanderbilt Company Inc., Norwalk, Conn. 1990. Examples that may be mentioned are vinylidene fluoride/hexafluoropropene copolymers, vinylidene fluoride/hexafluoropropene/tetrafluoroethene terpolymers, and vinylidene fluoride/tetrafluoropropene/perfluorinated methyl vinyl ether terpolymers.

Examples of suitable fluororubbers are produced, for example, by DuPont as Viton, by 3M as Fluorel, by Montefluos as Tecnoflon and by Daikin Kogyo Co., Japan as Dai-el. The selection of the types of rubber depends on the desired properties of the vulcanizate.

The compounded fluororubber materials can comprise, alongside the rubber, a limited number of additives, such as fillers, colorant pigments, processing aids, lubricants or metal oxides as acid scavengers. They also comprise a vulcanizing agent.

Any filler used can comprise various carbon blacks and mineral fillers. Any processing aid and plasticiser used can comprise inter alia liquid fluororubber. A suitable lubricant is inter alia carnauba wax or low molecular-weight polyethylene. Metal oxides, e.g. magnesium oxide, are generally added to all fluororubber mixtures. These give a high degree of crosslinking and at the same time act as acceptors for hydrogen fluoride, which is produced during the vulcanization process.

Vulcanizing agents suitable for fluororubber mixtures are based inter alia on bisphenols and phosphonium compounds. These are often already present in the main polymer.

Types of fluororubber which comprise no crosslinking agent are generally crosslinked by diamine compounds, e.g. hexamethylenediamine carbonate, or by organic peroxides, in the presence of, for example, triallyl isocyanurate.

As far as suitable additives and crosslinking agents are concerned, it is advisable to follow the instructions of the fluororubber producer, e.g. in the respective product brochures. The invention is not restricted to particular crosslinking agents.

Nitrile rubber (NBR) is obtained through copolymerization of acrylonitrile and butadiene in quantitative proportions of about 51:48 to 82:18. It is produced practically exclusively in aqueous emulsion. The resultant emulsions here are worked up to give the solid rubber for use for the purposes of this invention. HNBR is hydrogenated nitrile rubber.

AEM rubbers (or EACM rubbers) are copolymers made of ethylene, acrylate (e.g. methyl acrylate) and a third, carboxylated monomer, by way of which the, for example, aminic, crosslinking process proceeds (U.S. Pat. No. 3,883,472). Elastomers of this type are very similar to ACM but feature better strength and heat resistance but poorer mineral oil resistance, and were first marketed in 1975 by DuPont as VAMAC. Peroxidic or aminic crosslinking is used.

The rubber can be present in unfunctionalized form. In particular instances, adhesion of the composite can be further improved if the rubber is functionalized, for example through introduction of carboxy groups or of anhydride groups.

The composite parts can be produced in one stage or in two stages.

In the case of the two-stage process, the stiff moulding is first produced, for example through injection moulding, extrusion, embossing or compression moulding, and in a second step is brought into contact with the optionally pre-moulded compounded rubber material and exposed to the conditions required to vulcanize the rubber. The contact between the stiff moulding and the rubber can be achieved through compression moulding, embossing, injection moulding or extrusion.

The procedure in the two-stage injection moulding process is similar to that in the two-stage production of two-colour injection mouldings. A moulding of the abovementioned hard materials is used as insert. The cylinder and screws of the injection moulding machine have been designed in a known manner for rubber processing, and the mould can be heated to vulcanization temperature. If external demoulding aids are used, care has to be taken that they do not pass into the boundary layer of the materials, since they can impair adhesion of the composite.

The ideal vulcanization conditions depend on the rubber mixture selected, and in particular on its vulcanization system, and on the shape of the moulding. The known values obtained from experience can be used here as a guide.

Suitable temperatures of the rubber mixture in the cylinder are generally in the range from 40 to 80° C., preferably from 60 to 70° C. However, they can also be higher in individual cases.

Suitable mould temperatures depend on the softening points of the inserts. They are generally in the range from 140 to 200° C. Temperatures in the upper part of the range, e.g. from 170 to 190° C., are selected if this is permitted by the softening ranges of the inserts. The vulcanization times depend not only on the rubber mixture but also on the vulcanization temperatures and on the geometry of the parts. They are generally from 30 s to 15 min; lower temperatures and thicker rubber parts require longer times.

For the contact and vulcanization process in the two-stage extrusion process, by way of example, a profile produced in the first stage, made of a polyamide moulding composition, e.g. a tube, is sheathed with the rubber composition and vulcanized optionally under pressure. A corresponding procedure is used with sheets made of polyamide moulding compositions.

In the case of the single-stage injection moulding process, operations are carried out by analogy with the single-stage two-colour injection moulding process. In this case, there is one injection moulding machine equipped for processing the thermoplastic, and the other injection moulding machine has been equipped for processing the rubber. The mould, or the cavity for the rubber composition, is heated to the prescribed vulcanization temperature, which should be below the solidification point of the polyamide moulding composition.

Examples of applications for the components according to the invention made firstly of the polyamide moulding compositions and secondly of the abovementioned compounded rubber materials are gaskets, housings for motors, pumps and electrically operated tools, rolls, tyres, couplings, buffers, conveyor belts, and sound-deadening and vibration-damping components.

Examples are used below to illustrate the invention.

Production of a Suitable Graft Copolymer:

4.75 kg of laurolactam were melted at from 180 to 210° C. in a heating tank, and were transferred to a pressure-resistant polycondensation tank. 250 ml of water and 57 ppm of hypophosphorous acid were then added. The laurolactam was cleaved at 280° C. under the resultant autogenous pressure. The system was then depressurized within the period of 3 h to a residual water vapour pressure of 3 bar, and 250 g of polyethyleneimine (Lupasol G 100, polyethyleneimine from BASF AG, Ludwigshafen) were added. The system was then depressurized to atmospheric pressure and polycondensed at 250° C. for 2 h under a stream of nitrogen. The clear melt was discharged in the form of a strand by way of a melt pump, cooled in a water bath and then pelletized.

Properties of the Resultant Polymer:
  Melting point $T_m$: 170° C.,
  Amino group concentration: 879 mmol/kg,
  Terminal carboxy group concentration: <10 mmol/kg.

Polyamide used (PA): Copolyamide made of 32.5 mol % of terephthalic acid, 12.5 mol % of isophthalic acid, 5 mol % of adipic acid and 50 mol % of hexamethylenediamine.

Compounded Rubber Material:

| | |
|---|---|
| BUNA ® EP G6170 (EPDM) | 92.50 phr |
| VESTENAMER ® 8012 (polyoctenamer) | 7.50 phr |
| Durex 0 (carbon black) | 100.00 phr |
| Sunpar 150 (paraffinic oil) | 30.00 phr |
| ZnO RS (zinc oxide) | 5.00 phr |
| 3-Methacryloxypropyltrimethoxysilane | 2.00 phr |
| Triallyl cyanurate | 1.50 phr |
| Vulkanox HS (antioxidant) | 2.00 phr |
| Perkadox 14/40 (vulcanizing agent) | 7.50 phr |
| Total | 248.00 phr |

Production and Testing of Plastics-Rubber Composites:

The following were incorporated into the melt of the polyamide by way of a twin-screw kneader: The graft copolymer in Examples 1 and 2, and the glass fibres in Example 2 and Comparative Example 2. Sheets of dimensions 100 mm×100 mm×4 mm were injection-moulded from the moulding compositions. Corresponding sheets were compression-moulded from the compounded rubber material.

A Schwabenthan Polystat 200T was then used to laminate sheets of the polyamide moulding compositions to sheets of the compounded rubber material using a ram pressure of 200 bar for 15 min at 180° C. A peel test was then used to determine adhesion of the composite. Table 1 gives the results. There is seen to be a substantial improvement in adhesion of the composite in Examples 1 and 2 according to the invention.

TABLE 1

Results of experiments

| | Examples | | | |
|---|---|---|---|---|
| | CE1[b] | 1 | CE2[b] | 2 |
| PA [parts by weight] | 100 | 80 | 70 | 55 |
| Graft copolymer [parts by weight] | — | 20 | — | 15 |
| Glass fibre [parts by weight][a] | — | — | 30 | 30 |
| Adhesion [N/mm] | 1.5 | 10.5 | 1.5 | 14.4 |

[a]ChopVantage HP 3610 (PPG)
[b]Comparative examples

The invention claimed is:

1. A composite part comprising:
   (1) a subsection comprising a polyamide molding composition and
   (2) a subsection comprising a vulcanized elastomer,
   wherein subsection (1) and subsection (2) are in contact with each other,
   wherein the polyamide molding composition comprises at least 40% by weight of a mixture,
   the mixture has a content of from 60 to 99 parts by weight of polyamide based on 100 parts by weight of the mixture, the balance of the mixture being a graft copolymer,
   the graft copolymer comprises from 0.5 to 25% by weight, based on the graft copolymer, of a polyamine having at least 4 nitrogen atoms, and from 75 to 99.5% by weight, based on the graft copolymer, of a polyamide-forming monomer, and
   the polyamide-forming monomer is a lactam, an ω-aminocarboxylic acid, an equimolar combination of diamine and dicarboxylic acid, or any combination thereof.

2. The composite part of claim 1, wherein the polyamide molding composition comprises an aliphatic polyamide.

3. The composite part of claim 1, wherein the polyamide molding composition comprises a semiaromatic polyamide in which from 5 to 100 mol % of a dicarboxylic acid fraction derives from aromatic dicarboxylic acid having from 8 to 22 carbon atoms.

4. The composite part of claim 3, wherein a crystallite melting point $T_m$ of the semiaromatic polyamide is at least 250° C. according to ISO 11357-3.

5. The composite part of claim 1, wherein the polyamide molding composition comprises a transparent polyamide.

6. The composite part of claim 5, wherein glass transition temperature $T_g$ of the transparent polyamide is at least 110° C. according to ISO 11357-3.

7. The composite part of claim 1, wherein the polyamine is a branched polyethyleneimine obtained by a process comprising polymerizing an aziridine.

8. The composite part of claim 1, wherein the elastomer is an EPDM, an EPM, an ACM, a fluororubber, an NBR, an HNBR, an AEM, or any combination thereof.

9. The composite part of claim 1, wherein the vulcanized elastomer is obtained by a process comprising vulcanizing a compounded rubber material which comprises, in addition to the elastomer, a vulcanizing agent, a vulcanization activator, an oil, a filler, or any combination thereof.

10. A process for producing the composite part of claim 1, comprising:
    vulcanizing a compounded rubber material in contact with the polyamide molding composition.

11. The composite part of claim 1, wherein the polyamide molding composition has a content of at least 50% by weight of the mixture.

12. The composite part of claim 1, wherein the mixture comprises from 65 to 98 parts by weight of polyamide, based on 100 parts by weight of the mixture.

13. The composite part of claim 1, wherein the graft copolymer has a content of from 1 to 20% by weight, based on the graft copolymer, of the polyamine having at least 4 nitrogen atoms.

14. The composite part of claim 1, wherein the graft copolymer comprises a polyamine having at least 8 nitrogen atoms.

15. The composite part of claim 1, wherein the from 60 to 99 parts by weight of polyamide comprise from 1 to 70 parts by weight of a polyetheramide, based on 100 parts by weight of the mixture.

16. The composite part of claim 1, wherein an amino group concentration in the graft copolymer is from 100 to 2500 mmol/kg.

17. The composite part of claim 1, wherein the polyamide-forming monomer comprises ε-caprolactam, ε-aminocaproic acid, caprylolactam, ω-aminocaprylic acid, laurolactam, ω-aminododecanoic acid, ω-aminoundecanoic acid, or any combination thereof.

18. The composite part of claim 1, wherein the polyamide molding composition further comprises another polymer, a fibrous reinforcing material, a filler, a plasticizer, a pigment, a dye, a flame retardant, a processing aid, a stabilizer, or any combination thereof.

* * * * *